(12) United States Patent
Bhattacharjee et al.

(10) Patent No.: US 9,524,232 B2
(45) Date of Patent: *Dec. 20, 2016

(54) INTER-CORE COOPERATIVE TLB PREFETCHERS

(71) Applicant: The Trustees of Princeton University, Princeton, NJ (US)

(72) Inventors: Abhishek Bhattacharjee, Princeton, NJ (US); Margaret Martonosi, Skillman, NJ (US)

(73) Assignee: Trustees of Princeton University, Princeton, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/506,203

(22) Filed: Oct. 3, 2014

(65) Prior Publication Data

US 2015/0058592 A1    Feb. 26, 2015

Related U.S. Application Data

(63) Continuation of application No. 12/723,012, filed on Mar. 12, 2010, now Pat. No. 8,880,844.

(51) Int. Cl.
*G06F 12/10* (2016.01)
*G06F 12/02* (2006.01)
*G06F 12/08* (2016.01)

(52) U.S. Cl.
CPC ....... *G06F 12/0215* (2013.01); *G06F 12/1009* (2013.01); *G06F 12/1027* (2013.01); *G06F 12/0862* (2013.01); *G06F 2212/1016* (2013.01); *G06F 2212/6022* (2013.01); *G06F 2212/654* (2013.01); *G06F 2212/681* (2013.01); *G06F 2212/682* (2013.01); *G06F 2212/684* (2013.01)

(58) Field of Classification Search
CPC .................................................. G06F 12/1027
USPC ......................................................... 711/205
See application file for complete search history.

(56) References Cited

U.S. PATENT DOCUMENTS

| | | |
|---|---|---|
| 5,428,757 A | 6/1995 | Sutton |
| 5,835,962 A | 11/1998 | Chang et al. |
| 6,175,898 B1 | 1/2001 | Ahmed et al. |

(Continued)

OTHER PUBLICATIONS

Anderson, T.E., et al., "The Interaction of Architectural and Operating System Design," Proceedings of the Fourth International Conference on Architecture Support for Programming Languages and Operating Systems (ASPLOS-IV), Apr. 8-11, 1991, Santa Clara, CA, ACM, 13 pages.

(Continued)

*Primary Examiner* — Jae Yu
(74) *Attorney, Agent, or Firm* — Withrow & Terranova, P.L.L.C.

(57) ABSTRACT

A chip multiprocessor includes a plurality of cores each having a translation lookaside buffer (TLB) and a prefetch buffer (PB). Each core is configured to determine a TLB miss on the core's TLB for a virtual page address and determine whether or not there is a PB hit on a PB entry in the PB for the virtual page address. If it is determined that there is a PB hit, the PB entry is added to the TLB. If it is determined that there is not a PB hit, the virtual page address is used to perform a page walk to determine a translation entry, the translation entry is added to the TLB and the translation entry is prefetched to each other one of the plurality of cores.

31 Claims, 14 Drawing Sheets

(56) References Cited

U.S. PATENT DOCUMENTS

| | | | |
|---|---|---|---|
| 8,880,844 B1 | 11/2014 | Bhattacharjee et al. | |
| 2002/0087800 A1* | 7/2002 | Abdallah et al. | 711/137 |
| 2004/0225771 A1* | 11/2004 | Riesenman et al. | 710/200 |
| 2009/0055596 A1* | 2/2009 | Wallach et al. | 711/141 |

OTHER PUBLICATIONS

Bhattacharjee, A., et al., "Characterizing the TLB Behavior of Emerging Parallel Workloads on Chip Multiprocessors," Proceedings of the 18th International Conference on Parallel Architectures and Compilation Techniques (PACT '09), Sep. 12-16, 2009, Raleigh, NC, IEEE, 12 pages.

Bienia, C. et al., "The PARSEC Benchmark Suite: Characterization and Architectural Implications," Princeton University Technical Report TR-811-08, Proceedings of the 17th International Conference on Parallel Architectures and Compilation Techniques (PACT '08), Oct. 25-29, 2008, Toronto, Canada, ACM, 22 pages.

Chen, J.B., et al., "A Simulation-Based Study of TLB Performance," WRL Research Report 91/2, Proceedings of the 19th International Symposium on Computer Architecture, May 1992, Digital Equipment Corporation, 32 pages.

Chen, Tien-Fu, et al., "Effective Hardware-Based Data Prefetching for High-Performance Processors," IEEE Transactions on Computers, vol. 44, No. 5, May 1995, IEEE, 15 pages.

Clark, D.W., et al., "Performance of the VAX-11/780 Translation Buffer: Simulation and Measurement," ACM Transactions on Computer Systems, vol. 3, No. 1, Feb. 1985, ACM, pp. 31-62.

Dahlgren, F., et al., "Fixed and Adaptive Sequential Prefetching in Shared Memory Multiprocessors," Proceedings of the International Conference on Parallel Processing (ICPP '93), Aug. 16-20, 1993, Syracuse, NY, IEEE, pp. 56-63.

Huck, J., et al., "Architectural Support for Translation Table Management in Large Address Space Machines," Proceedings of the 20th Annual International Symposium on Computer Architecture (ISCA '93), May 16-19, 1993, IEEE, pp. 39-50.

Jacob, B., et al., "Software-Managed Address Translation," Proceedings of the Third International Symposium on High Performance Computer Architecture, San Antonio, Texas, Feb. 1-5, 1997, IEEE, 12 pages.

Jacob, B., et al., "A Look at Several Memory Management Units TLB-Refill Mechanisms, and Page Table Organizations," Proceedings of the Eighth International Conference on Architectural Support for Programming Languages and Operating Systems (ASPLOS-VIII), San Jose, California, Oct. 3-7, 1998, ACM, 12 pages.

Jacob, B., et al., "Virtual Memory in Contemporary Microprocessors," IEEE Micro, Jul./Aug. 1998, IEEE, pp. 60-75.

Joseph, D., et al., "Prefetching using Markov Predictors," Proceedings of the 24th Annual International Symposium on Computer Architecture (ISCA '97), Denver, Colorado, Jun. 1-4, 1997, ACM, pp. 252-263.

Kandiraju, G.B., et al., "Characterizing the d-TLB Behavior of SPEC CPU2000 Benchmarks," Proceedings of the 2002 ACM SIGMETRICS International Conference on Measurement and Modeling of Computer Systems, Jun. 15-19, 2002, Marina del Rey, CA, ACM, 11 pages.

Kandiraju, G.B., et al., "Going the Distance for TLB Prefetching: An Application-driven Study," Proceedings of the 29th Annual International Symposium on Computer Architecture (ISCA '02), May 25-29, 2002, IEEE, 12 pages.

Martin, M.M.K., et al., "Multifacet's General Execution-driven Multiprocessor Simulator (GEMS) Toolset," ACM SIGARCH Computer Architecture News, vol. 33, Issue 4, Nov. 2005, ACM, 8 pages.

Nagle, D., et al., "Design Tradeoffs for Software-Managed TLBs," Proceedings of the IEEE/ACM 20th Annual International Symposium on Computer Architecture, May 1993, San Diego, California, IEEE, pp. 27-38.

Qui, X., et al., "Options for Dynamic Address Translation in COMAs," Proceedings of the 25th Annual International Symposium on Computer Architecture, Jun. 27-Jul. 1, 1998, Barcelona, Spain, IEEE, pp. 214-225.

Rosenblum, M., et al., "The Impact of Architectural Trends on Operating System Performance," Proceedings of the Fifteenth ACM Symposium on Operating Systems Principles (SOSP '95), Dec. 3-6, 1995, Copper Mountain, CO, ACM, pp. 285-298.

Saulsbury, A., et al., "Recency-Based TLB Preloading," Proceedigns of the 27th Annual International Symposium on Computer Architecture (ISCA 2000), Jun. 10-14, 2000, Vancouver, British Columbia, ACM, pp. 117-127.

Srinivasan, Viji et al., "A Prefetch Taxonomy," IEEE Transactions on Computers, vol. 53, Issue 2, Feb. 2004, IEEE, pp. 126-140.

Author Unknown, "UltraSPARC III Cu User's Manual," Sun Microsystems, Version 2.2.1, Jan. 2004, Sun Microsystems, Inc., 732 pages.

Talluri, M., "Surpassing the TLB Performance of Superpages with Less Operating Systems Support," Proceedings of the Sixth International Conference on Architectural Support of Programming Languages and Operating Systems (ASPLOS VI), Oct. 5-7, 1994, San Jose, CA, ACM, 14 pages.

Talluri, Madhusudhan, "Use of Superpages and Subblocking in the Address Translation Hierarchy," Dissertation submitted in partial fulfillment of the requirements for the degree of Doctor of Philosophy (Computer Science), University of Wisconsin—Madison, 1995, 193 pages.

Non-final Office Action for U.S. Appl. No. 12/723,012 mailed May 22, 2012, 6 pages.

Final Office Action for U.S. Appl. No. 12/723,012 mailed Aug. 23, 2012, 7 pages.

Advisory Action for U.S. Appl. No. 12/723,012 mailed Nov. 7, 2012, 3 pages.

Non-final Office Action for U.S. Appl. No. 12/723,012 mailed May 21, 2013, 7 pages.

Final Office Action for U.S. Appl. No. 12/723,012 mailed Oct. 22, 2013, 7 pages.

Advisory Action for U.S. Appl. No. 12/723,012 mailed Jan. 8, 2014, 3 pages.

Notice of Allowance for U.S. Appl. No. 12/723,012 mailed Jun. 27, 2014, 8 pages.

\* cited by examiner

INTER-CORE COOPERATIVE TLB PREFETCHERS

RELATED APPLICATION

This application is a continuation of U.S. patent application Ser. No. 12/723,012 filed on Mar. 12, 2010, now U.S. Pat. No. 8,880,844, the disclosure of which is hereby incorporated by reference in its entirety.

GOVERNMENT SUPPORT

This invention was made with government funds under contract No. HR0011-07-3-0002 awarded by DARPA and contract No. CNS0627650 awarded by the NSF. The U.S. Government has rights in this invention.

FIELD OF THE INVENTION

The invention relates to a system and method for reducing Translation Lookaside Buffer and prefetch buffer misses in N-core chip multiprocessors (CMPs).

BACKGROUND OF THE INVENTION

To avoid high-latency accesses to operating system (OS) page tables storing virtual-to-physical page translations, processor Memory Management Units (MMUs) store commonly used translations in instruction and data Translation Lookaside Buffers (TLBs). Most contemporary systems place TLBs in parallel with the first-level cache. Due to their long miss penalties, TLB behavior affects processor performance significantly. As a result, numerous techniques have been proposed to improve TLB performance. On the hardware side, TLB characteristics such as size, associativity, and the use of multilevel hierarchies have been explored. On the software side, the concept of superpaging has been examined. Hardware/software prefetching techniques have also been investigated in detail. While effective, proposed prefetchers are specific to uniprocessors. With the growing dominance of chip multiprocessors (CMPs), it is advantageous to examine TLB performance in the context of parallel workloads. Recent characterizations of emerging parallel workloads on CMPs show that significant similarities exist in TLB miss patterns among multiple cores. This occurs either in the form of TLB misses caused by identical virtual pages on multiple cores, or in the form of predictable strides between virtual pages causing TLB misses on different cores.

Since TLBs are usually placed in parallel with first-level caches, CMPs maintain per-core instruction and data TLBs, which are largely oblivious to the behavior of other TLBs, except for shootdowns used for coherence. These TLBs are either hardware managed or software managed. Hardware-managed TLBs use a hardware state machine to walk the page table, locate the appropriate mapping, and insert it into the TLB on every miss. Because the page-table walk is initiated by a hardware structure, there is no need for expensive interrupts and the pipeline remains largely unaffected. Moreover, the handling state machine does not pollute the instruction cache. Past studies have shown the performance benefits of hardware managed TLBs, with typical miss latencies ranging from 10 to 50 cycles. Although hardware-managed TLBs do offer performance benefits, they also imply a fixed page table organization. As such, the operating system (OS) cannot employ alternate designs.

In response, reduced instruction set computing (RISC) architectures such as MIPS and scalable processor architecture (SPARC) often use software-managed TLBs. In such instances, a TLB miss causes an interrupt, and the OS executes a miss handler which walks the page table and refills the TLB. Since the OS controls the page table walk, the data structure design is flexible. This flexibility, however, comes with an associated performance cost. First, precise interrupts prompt pipeline flushes, removing a possibly large number of instructions from the reorder buffer. Second, the miss handler tends to be 10 to 100 instructions long and may itself miss in the instruction cache. In addition, the data cache may also be polluted by the page table walk.

All these factors contribute to TLB miss latencies that can span hundreds of cycles. Numerous studies in the 1990s investigated the performance overheads of TLB management in uniprocessors. Studies placed TLB handling at 5-10% of system runtime with extreme cases at 40% of runtime. To tackle TLB management overheads, early work addressed hardware characteristics such as TLB size, associativity, and multilevel hierarchies.

More recently, TLB prefetching schemes have also been explored. For example, Recency-based prefetching has been introduced to exploit the observation that pages referenced around the same time in the past will be referenced around the same time in the future. In this approach, two sets of pointers are added to each page table entry to track virtual pages referenced in temporal proximity to the current virtual page. While effective, this strategy leads to a larger page table.

In response, cache prefetching techniques have been adapted, such as Sequential, Arbitrary-Stride and Markov prefetching. These prefetching algorithms propose a Distance-based TLB prefetcher which tries to detect repetitive strides as well as the patterns that Markov and Recency prefetching provide while employing a modest amount of hardware. Specifically, the Distance-based approach tracks the difference, or distance, between successive TLB miss virtual pages and attempts to capture repetitive distance pairs in the miss stream. On every TLB miss, the goal is to use the distance between the last miss virtual page and current miss virtual page to predict the next expected distance and hence, the next miss virtual page. A prefetch is then initiated for the predicted next miss virtual page.

While these prefetchers exhibit performance benefits, they all target uniprocessors. As CMPs become ubiquitous, there exists a need to improve the performance of CMPs by reducing TLB misses across multiple cores.

SUMMARY OF THE INVENTION

In accordance with an exemplary and non-limiting embodiment a chip multiprocessor includes a plurality of cores each having a translation lookaside buffer (TLB) and a prefetch buffer (PB). Each core is configured to determine a TLB miss on the core's TLB for a virtual page address and determine whether or not there is a PB hit on a PB entry in the PB for the virtual page address. If it is determined that there is a PB hit, the PB entry is added to the TLB. If it is determined that there is not a PB hit, the virtual page address is used to perform a page walk to determine a translation entry, the translation entry is added to the TLB and the translation entry is prefetched to each other one of the plurality of cores.

In accordance with an exemplary and non-limiting embodiment a method for performing Leader-Follower prefetching includes determining a TLB miss on a TLB for a virtual page address and determining whether or not there is a PB hit on a PB entry in a PB for the virtual page address. If it is determined that there is a PB hit, the PB entry is added to the TLB. Conversely, if it is determined that there is not a PB hit, the virtual page address is used to perform a page walk to determine a translation entry, the translation entry is added to the TLB and the translation entry is prefetched to each of one or more cores.

In accordance with an exemplary and non-limiting embodiment a chip multiprocessor includes a plurality of cores each having a translation lookaside buffer (TLB) and a prefetch buffer (PB). Each of the cores is configured to determine a TLB miss on the TLB for a virtual page address and determine whether or not there is a PB hit on a PB entry in the PB for the virtual page address. If it is determined that there is a PB hit the PB entry is added to the TLB and, if it is determined that the PB entry was prefetched from another of the plurality of cores, a request is sent to the other core from which the PB entry was prefetched requesting an increase in a value of a confidence counter associated with the core. Conversely, if it is determined that there is not a PB hit, the virtual page address is used to perform a page walk to determine a translation entry and the translation entry is added to the TLB.

In accordance with an exemplary and non-limiting embodiment a method for performing Leader-Follower prefetching comprises determining, at a core, a TLB miss on a TLB for a virtual page address and determining whether or not there is a PB hit on a PB entry in a PB for the virtual page address. If it is determined that there is a PB hit the PB entry is added to the TLB and, if it is further determined that the PB entry was prefetched from another core, a request is sent to the other core from which the PB entry was prefetched requesting an increase in a value of a confidence counter associated with the core. Conversely, if it is determined that there is not a PB hit, the virtual page address is used to perform a page walk to determine a translation entry. The translation entry is then added to the TLB and prefetched to each of one or more cores associated with a confidence counter value greater than a predetermined amount. A request is then sent to each of one or more other cores to increase the value of a confidence counter associated with the core.

In accordance with an exemplary and non-limiting embodiment a chip multiprocessor includes a plurality of cores each comprising a translation lookaside buffer (TLB) and a prefetch buffer (PB). Each of the plurality of cores is configured to determine a current TLB miss on the TLB for a current virtual page address and determine if a context ID of the current TLB miss is equal to a context ID of a last TLB miss. If it is determined that the context ID of the current TLB miss is equal to the context ID of the last TLB miss, a current distance between the current virtual page address and a last virtual page address is determined and a request to query a distance table comprising the current distance is sent. Then, in response to the request, a predicted future distance between the current virtual page address and a next virtual page address predicted to result in a future TLB miss is received. In accordance with an exemplary and non-limiting embodiment a method for performing Distance-based Cross-Core prefetching comprises determining a current TLB miss on a TLB for a current virtual page address and determining if a context ID of the current TLB miss is equal to a context ID of a last TLB miss. If it is determined that the context ID of the current TLB miss is equal to the context ID of the last TLB miss a current distance between the current virtual page address and a last virtual page address is determined a request comprising the current distance is sent to query a distance table. Then, in response to the request, a predicted future distance between the current virtual page address and a next virtual page address predicted to result in a future TLB miss is received.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
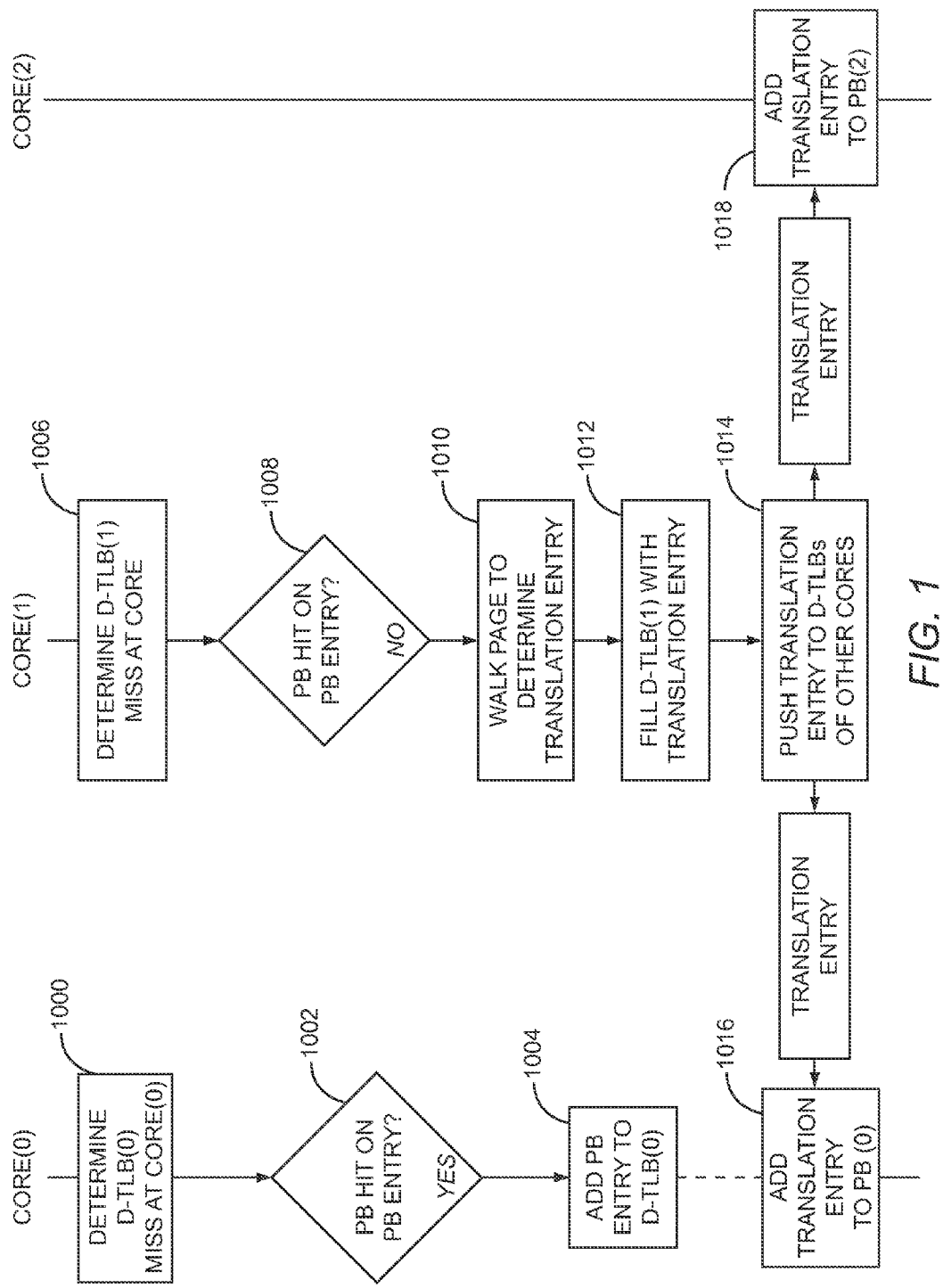
FIG. 1 is a flow chart illustrating the operation of a plurality of cores in an N-Core chip multiprocessor (CMP) according to an exemplary embodiment of a Leader-Follower prefetching scheme.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

As discussed more fully below, CMP-targeted TLB prefetchers enable performance improvements of parallel applications. While described and illustrated herein with reference to dual translation lookaside buffers (D-TLBs), it is understood that the methods developed and described herein apply equally to all TLBs, including both D-TLBs and instruction translation lookaside buffers (I-TLBs). As a result, references to "D-TLB" and "TLB" may be used interchangeably herein.

As described in accordance with exemplary and non-limiting embodiments, a method utilizes TLB prefetchers to exploit common TLB miss patterns among multiple cores for performance benefits. Specifically, two related methodologies are described for performing TLB prefetching. One exemplary embodiment, referred to herein as "Leader-Follower" prefetching, exploits common TLB miss virtual pages among cores by pushing TLB mappings from a "leader" core to other cores, reducing TLB misses. In accordance with another exemplary embodiment, a distance-based prefetching mechanism is utilized to exploit stride-predictable TLB misses across CMP 12 cores.

In particular, as described below, by pushing TLB mapping information from the initial miss core (leader) to the other cores (followers), Leader-Follower prefetching can eliminate up to 57% of the TLB misses across the surveyed workloads. Confidence mechanisms also help to reduce over-aggressive prefetching. Furthermore, as described below, Distance-based Cross-Core prefetching captures repetitive TLB miss virtual page stride patterns between cores and within the same core.

In the discussion that follows, predictable TLB misses in CMPs are divided into two categories: (1) Inter-Core Shared (ICS) TLB Misses and (2) Inter-Core Predictable Stride (ICPS) TLB Misses. In an N-core CMP, a TLB miss on a core is ICS if it is caused by access to a translation entry with the same virtual page, physical page, context ID (process ID), protection information, and page size as the translation entry accessed by a previous miss on any of the other N−1 cores, within a 1 million instruction window. The number of cores that see this translation entry is referred to herein as the "number of sharers".

Typical N-core CMPs, such as dual-core and quad core CMPs, incorporate a binary number of cores, such as two and four cores, respectively. The exemplary embodiments of Leader-Follower prefetching and Distance-based Cross-Core prefetching described below are not limited to any number N (greater than 1) of cores, but rather, are applicable to any and all configuration incorporating any number of a plurality of cores. As is evident in the descriptions that follow, the exemplary embodiments are often illustrated via the operation of three cores. Because, in accordance with exemplary embodiments of Leader-Follower prefetching and Distance-based Cross-Core prefetching, each core behaves in the same manner in response to the same or similar inputs, the illustration of three cores is used herein as the minimum number of cores necessary to most easily and clearly illustrate the operation of the exemplary embodiments that follow.

Further, as described below, flowcharts illustrating the operation of multiple cores are exemplary. Specifically, in order to illustrate the operation of each core in response to different scenarios, a branch in the decision making process at one core may be illustrated by the steps preceding the branch occurring at two different cores with the subsequent operation of each core illustrated as following a different outcome.

In an N-core CMP, a TLB miss is ICPS with a stride of S if its virtual page V+S differs by S from the virtual page V of the preceding matching miss (context ID and page size must also match). In an exemplary embodiment the match is defined to occur within a 1 million instruction window, and the stride S must be repetitive and prominent to be categorized as ICPS.

In an exemplary embodiment, a method for performing Leader-Follower prefetching exploits the fact that in ICS-heavy situations, if a leader core TLB misses on a particular virtual page entry, other follower cores will also typically TLB miss on the same virtual page eventually. Since the leader core would already have found the appropriate translation, one can prevent the followers from missing on the same entry by pushing found translation into the follower core's TLBs.

FIG. 1 is a flowchart illustrating an exemplary embodiment of an algorithm for Leader-Follower prefetching assuming an N-core CMP 12 with per-core D-TLBs 14. As illustrated, entries are not prefetched directly into the TLB 14, but instead are inserted into a small, separate Prefetch Buffer (PB) 16 which is looked up concurrently with the TLB 14. This helps mitigate the challenge of prefetching into the TLB 14 too early and displacing useful information.

As described more fully below, each PB entry 18 maintains a Valid bit 20 and a Prefetch Type bit 22 (to indicate whether the entry arose from Leader-Follower or Distance based Cross-Core prefetching) in addition to the Translation Entry 24 which includes, but is not limited to a virtual page, a physical page, a context ID etc. On a PB entry hit, the particular PB entry 18 is removed from the PB 16 and inserted into the TLB 14. In an exemplary embodiment, the PB 16 uses a FIFO replacement policy, specifically, if an entry has to be evicted to accommodate a new prefetch, the oldest PB entry 18 is removed. If a newly prefetched PB entry's virtual page matches the virtual page of a current PB entry 18, the older entry is removed and the new prefetch is added to the PB 16 as the newest PB entry 18 of the FIFO.

Figure 2:
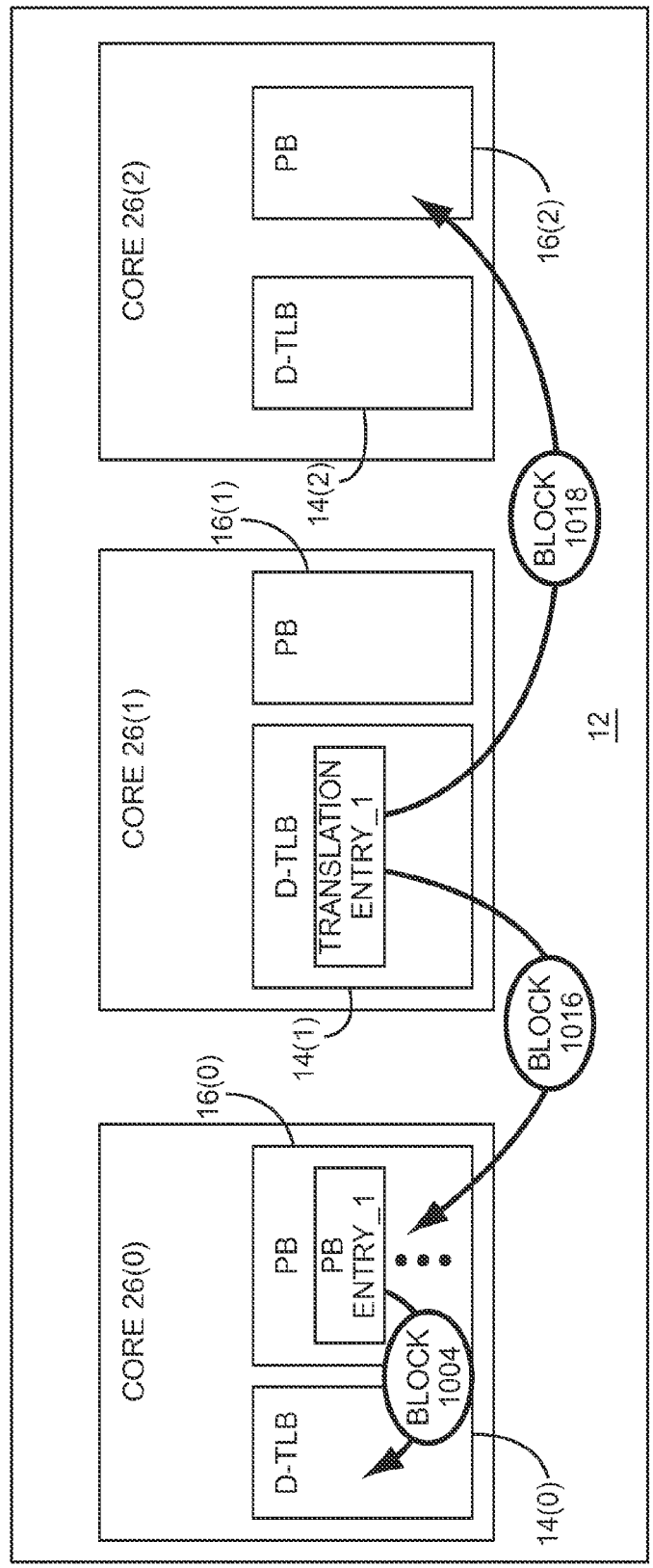
FIG. 2 is an illustration of the operation of a CMP according to the exemplary embodiment of FIG. 1.

For purposes of clarity, FIG. 1 is discussed herein with reference to FIG. 2. FIG. 2 is an illustration of a plurality of cores 26 showing each core's PB 16 and D-TLB 14 with explanatory arrows indicating the flow of information described with reference to FIG. 1. While illustrated showing the operation of three cores 26, as noted above, exemplary embodiments are not limited to any particular number of a plurality of cores 26.

With reference to FIG. 1, first, it is determined that D-TLB 14(0) of core 26(0) has encountered a miss for an address (block 1000). Next, a check is performed to see if there is a PB hit on a PB entry 18 corresponding to the address at PB 16(0) (block 1002). Then, if it is determined that there is a hit, the PB entry 18 from PB 16(0) is added it to D-TLB(0) (block 1004) and the process ends.

With reference to FIG. 2, the preceding scenario is illustrated as PB entry_1 originating in PB 16(0) with an arrow (associated with block 1004) indicating its removal and transfer to D-TLB 14(0).

Returning to FIG. 1, as illustrated, core 26(1) has likewise determined the occurrence of a D-TLB miss at D-TLB 14(1) (block 1006) and, further, that there is not a PB hit on a page entry corresponding to an address at PB 16(1)(block 1008). As a result, there is performed a page walk at core 26(1) to determine an appropriate translation entry (block 1010). Next, D-TLB 14(1) is filled with the determined translation entry (block 1012). Then, the determined translation entry is prefetched, or pushed, to the other cores 26(0), 26(2) (block 1014) and the process ends. Upon receiving the translation entry from core 26(1), each core 26(0), 26(2) adds the translation entry to its own PB 16 (blocks 1016-1018). This is done in order to reduce or eliminate future ICS misses on the other cores 26(0), 26(2).

Referring again to FIG. 2, there are illustrated blocks 1012-1018. As illustrated, the determined translation entry, translation entry_1, is illustrated as being filled into D-TLB 14(1) with arrows (associated with blocks 1016 and 1018) indicating its addition to each of PBs 16(0), 16(2).

The exemplary embodiment discussed above with reference to FIG. 1 and FIG. 2 illustrates the prefetching of a translation entry into all follower cores 26 every time a TLB and PB miss occurs on the leader core 26. However, this approach may be over-aggressive and cause bad prefetches. In accordance with standard cache prefetching taxonomy, as used herein, a prefetch as "bad" if it is evicted from a PB 16 without being used. This may happen either because the entry was prefetched incorrectly and would never have been referenced even in an PB 16 of infinite size, or because the finite size of the PB 16 prompts the entry to be evicted before its use. In the exemplary method described above, bad prefetching may arise due to, for example, blind prefetching from leader core 26(0) to one or more of follower cores 26(1), 26(2), even if the follower core 26(1), 26(2) does not share the particular entry.

For example, in one observed industry benchmark related to quad-cores, it has been shown that 22% of the D-TLB misses are shared by only two (2) cores, 45% by only three (3) cores, and 28% by all four (4) cores. However, for each D-TLB miss, the exemplary embodiment discussed above pushes the translation entry into all follower PBs 16. This methodology may result into two types of bad prefetches, which is classified herein by extending cache prefetch taxonomy. First, the bad prefetch of the translation entry may be "useless" in that it will be unused. Second, the prefetch may be "harmful" in that it will not only be unused, but will also render existing PB entries 18 useless by evicting them too early.

Figure 3:
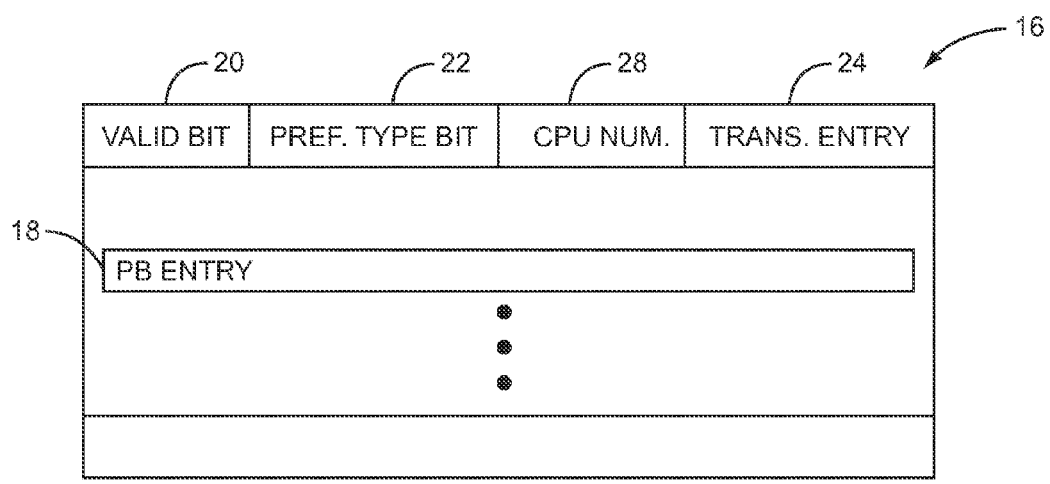
FIG. 3 is an illustration a prefetch buffer (PB) according to an exemplary embodiment.

In an exemplary and non-limiting embodiment, this problem is addressed by incorporating a confidence estimation. To implement a confidence estimation, modifications are described to both PBs 16 and the method described with reference to FIG. 1. FIG. 3 is an illustration of a PB 16 according to an exemplary and non-limiting embodiment. As illustrated, each PB 16 comprises a plurality of PB entries 18 including a CPU Number field 28 in addition to the baseline information described above. The CPU Number field 28 tracks the leader core 26 responsible for the prefetch of each PB entry 18.

Figure 4A:
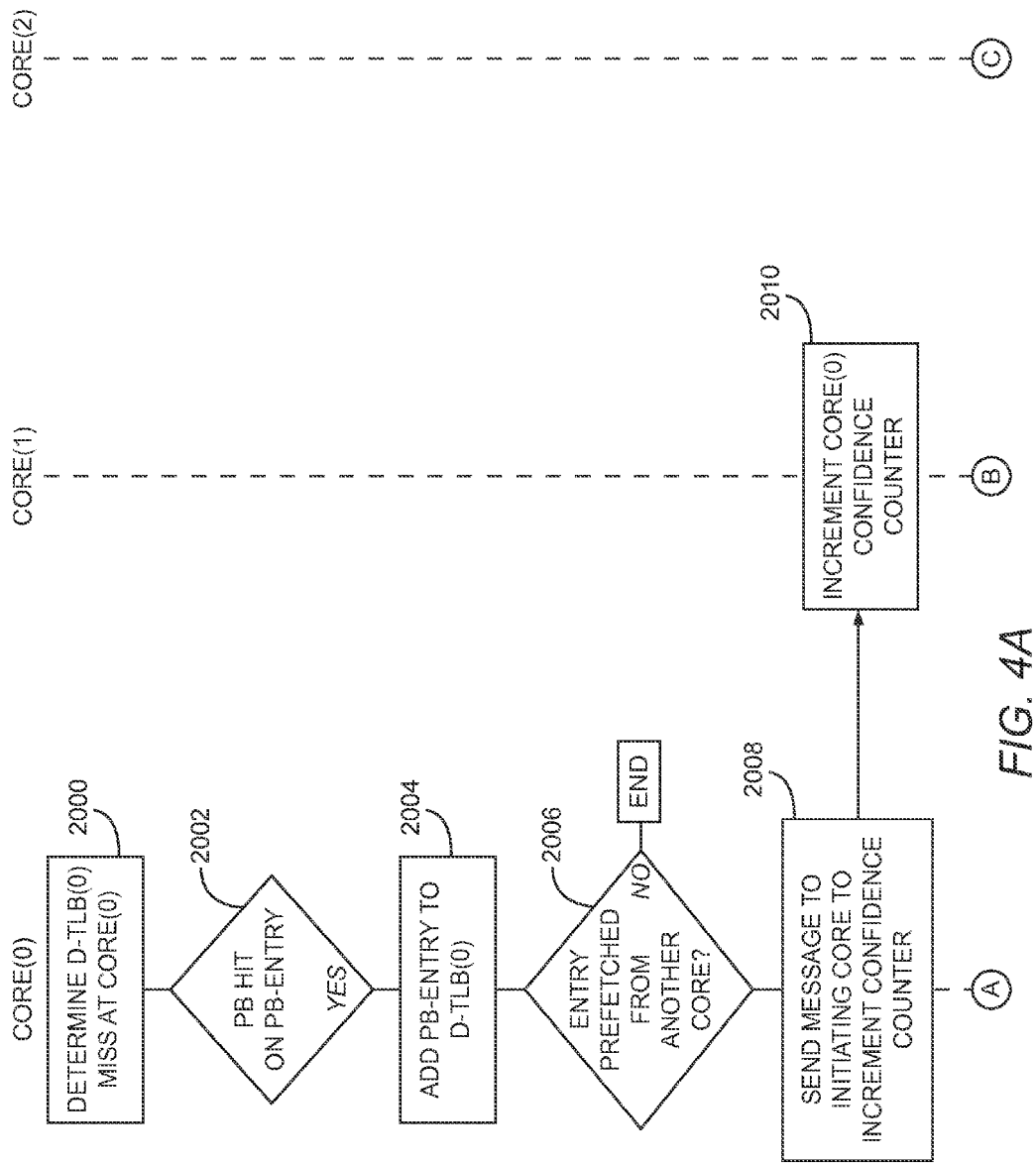
FIGS. 4A-4C illustrate a flow chart illustrating the operation of a plurality of cores in an N-Core CMP according to an exemplary embodiment of a Leader-Follower prefetching scheme incorporating the PB of FIG. 3.
Figure 4B:
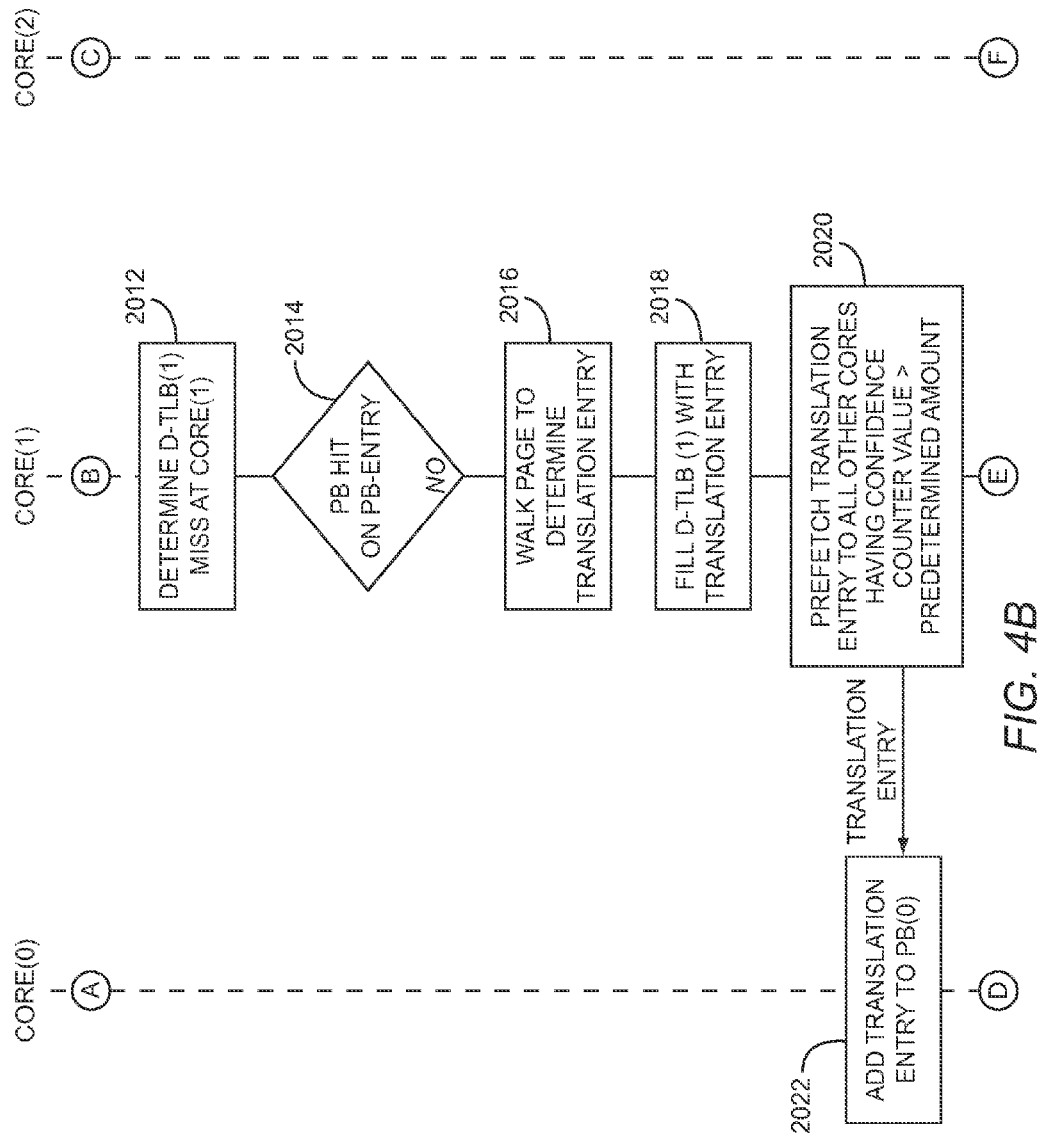
Figure 4C:
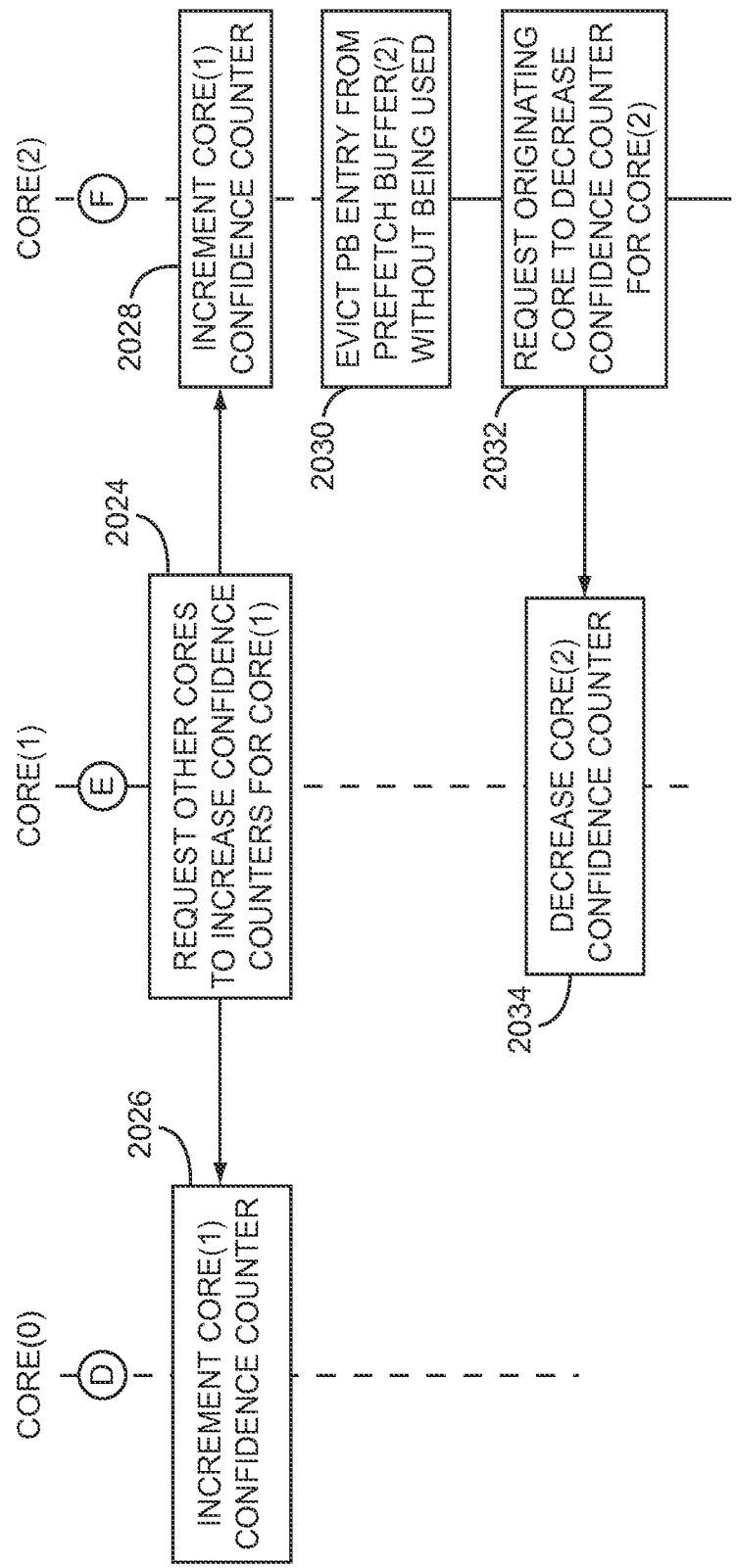
Figure 5:
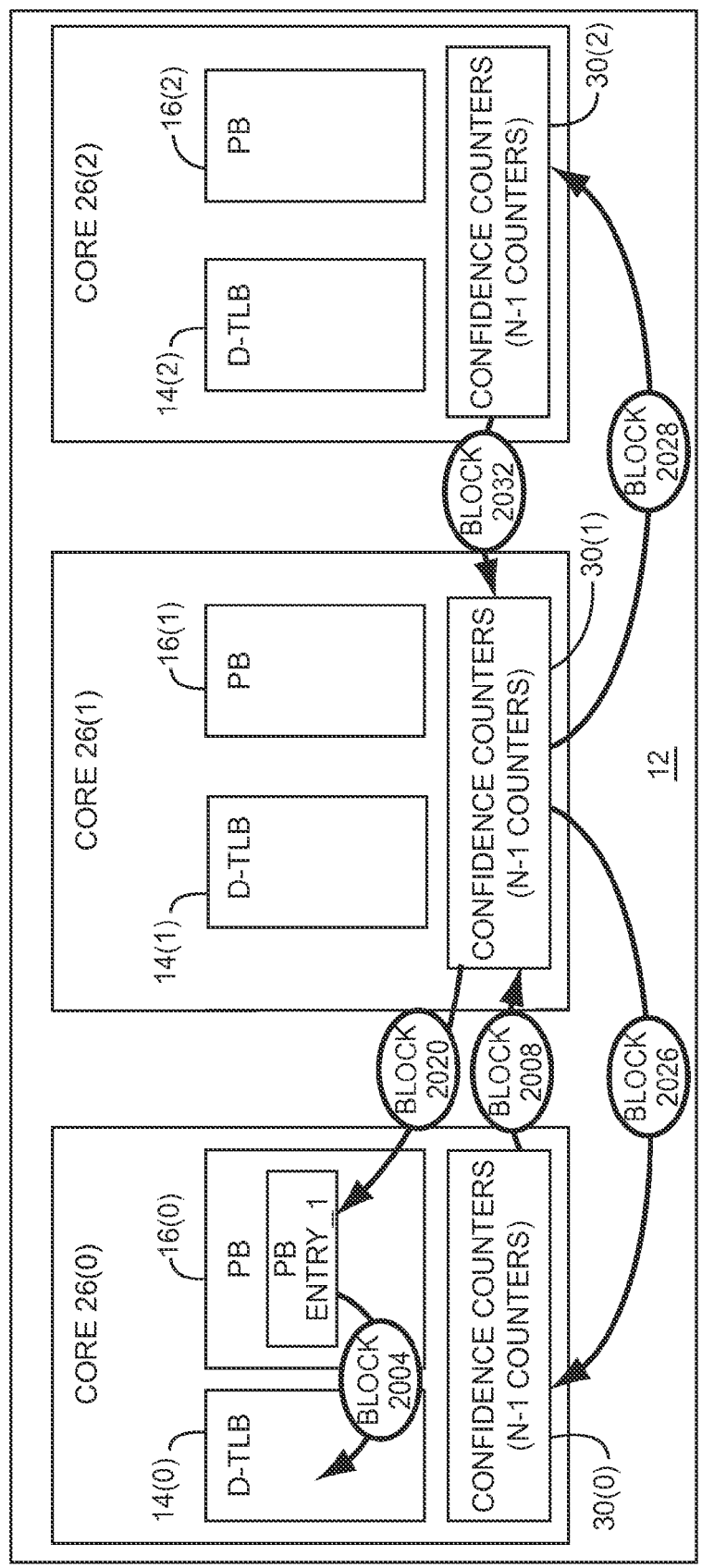
FIG. 5 is an illustration of the operation of a CMP according to the exemplary embodiment of FIGS. 4A-4C.

FIGS. 4A-4C illustrate an exemplary embodiment of a modification to the baseline Leader-Follower prefetching method described in FIGS. 1 and 2. For purposes of clarity, FIG. 4 is discussed herein with reference to FIG. 5. FIG. 5 is an illustration of a plurality of cores 26 showing each core's PB 16 and D-TLB 14 as well as each core's one or more confidence counters 30 with explanatory arrows indicating the flow of information described with reference to FIG. 4. In an exemplary embodiment, each core 26 of an N-core CMP 12 maintains N−1 confidence counters 30. Such confidence counters 30 may be implemented, for example, in one or more registers forming a part of CMP 12.

As illustrated, each core 26 maintains one or more confidence counters 30, one for every other core 26 in the system. Therefore, in the present example with an N-core CMP 12 (N=3), core 26(0) has saturating confidence counters for cores 26(1), 26(2), core 26(1) has saturating confidence counters for cores 26(0), 26(2), and core 26(2) has saturating confidence counters for cores 26(0), 26(1).

As before, it is first determined that D-TLB 14(0) of core 26(0) has encountered a miss for an address (block 2000). Next, a check is performed to see if there is a PB hit on a page entry corresponding to the address at PB 16(0) (block 2002). Then, if it is determined that there is a hit on the PB entry 18, the PB entry 18 is removed and inserted into the D-TLB 14(0)(block 2004). With reference to FIG. 5, the preceding scenario is illustrated as PB entry_1 originating in PB 16(0) with an arrow (associated with block 2004) indicating its removal and transfer to D-TLB 14(0).

Continuing with reference to FIG. 4, a check is then performed of the PB entry 18, specifically, the Prefetch Type bit 22, to see if the PB entry 18 was prefetched as a result of another core 26 prefetching the PB entry 18 and transmitting it to core 26(0) (block 2006). If it is determined that the PB entry 18 was prefetched as a result of another core 26 prefetching the PB entry 18, the initiating core 26 is identified from the CPU number field 28 of the PB entry 18 and a message is sent to increment the entry in the initiating core's confidence counter 30 corresponding to core 26(0) (block 2008).

With reference to FIG. 5, for purposes of illustration, it is assumed that the PB entry of core 26(0) on which there was a hit originated at core 26(1). This scenario is illustrated by arrow (associated with block 2008) extending from confidence counter 30(0) to the confidence counter 30(1). Returning to FIG. 4, upon receipt of the message, core 26(1) operates to increment the value associated with core 26(0) in confidence counter 30(1) by one (1)(block 2010). This is done because, based upon the PB entry hit, one has greater confidence that prefetches where core 26(1) is the leader and core 26(0) is the follower are useful.

As illustrated, it is determined that D-TLB 14(1) of core 26(1) has encountered a miss for a page entry (block 2012). Next, a check is performed to see if there is a PB hit on a page entry corresponding to the address at PB 16(1) (block 2014). In the example, it is determined that there was a PB miss on a page entry corresponding to an address at PB 16(1) and a page walk is performed at core 26(1) to determine an appropriate translation entry (block 2016). Then, D-TLB 14(1) is filled with the translation entry (block 2018). Next, confidence counters 30(1) are checked to decide which follower cores 26 to push the translation entry to. In an exemplary embodiment, the translation entry is prefetched to a follower core 26 if the entry in the B-bit confidence counter 30(0) associated with the core 26 is greater or equal to a predetermined amount, such as $2^{B-1}$ (block 2020). In the example, it is assumed that the entry in confidence counter 30(1) corresponding to core 26(0) is above this predetermined value, and as a result, the translation entry is prefetched to PB 16(0). Then, core 26(0), upon receiving the translation entry from core 26(1), adds the translation entry to its own PB 16(0) (block 2022). With reference to FIG. 5, the prefetching of the translation entry at block 2020 is illustrated by the arrow (associated with block 2020) extending from confidence counter 30(1) to PB 16(0).

Returning to FIG. 4, since core 26(1) suffered a PB miss, it is desired to increase the rate at which other cores 26(0), 26(2) prefetch to core 26(1). In response to this desire, core 26(1) sends messages to all other cores 26(0), 26(2) requesting an incremental increase to each confidence counter 30(0), 30(2) corresponding to core 26(1) (block 2024). In response to receipt of the message, each other core 26(0), 26(2) increments an entry in the associated confidence counter 30(0), 30(2) corresponding to core 26(1)(blocks 2026-2028).

With reference to FIG. 5, the preceding scenario is illustrated by the arrows (associated with blocks 2026 and 2028) extending from confidence counter 30(1) to confidence counters 30(0), 30(2).

Returning to FIG. 4, there is further illustrated a flowchart of the operation of core 26(2) when evicting a PB entry 18 from a PB 16(2). First, a PB entry 18 in PB 16(2) is evicted without being used, such as may happen when a new PB entry 18 is entered necessitating the eviction of an existing PB entry 18 (block 2030). A PB entry 18 that is evicted without being used corresponds to a bad prefetch. In response, a request is sent, in this example, to the originating core 26(1) from which the bad PB entry came (block 2032). Upon receipt of this message, originating core 26(1) decreases the confidence count entry corresponding to core 26(2)(block 2034). The result of this is that core 26(1) is less likely to receive prefetched PB entries from originating core 26(2).

With reference to FIG. 5, in the example illustrated, the preceding scenario is illustrated by the arrow (associated with block 2032) extending from confidence counter 30(2) to confidence counter 30(1) indicative of the message to decrease the confidence count entry corresponding to core 26(2).

Having disclosed above with reference to FIG. 4 and FIG. 5 Leader-Follower prefetching, the following advantages of the exemplary embodies described are noted as follow. First, Leader-Follower prefetching performs "single-push" prefetches whereby a TLB miss on one core 26 results in the subsequently determined, single translation entry being transmitted/prefetched to all other PBs 16. Second, the translation entries are prefetched from a core 26 to other follower cores 26 only after the leader core 26 walks the page table to find the appropriate translation entry. Further, in accordance with exemplary embodiments described herein, Leader-Follower prefetching is "shootdown-aware". Specifically, if a translation mapping or protection information is changed on, for example, a core 26(0), initiating a shootdown, TLBs 14 are sent an invalidation signal for the relevant entry. Specifically, a message is relayed to the PBs 16(1), 16(2) to invalidate any matching prefetch buffer entries.

The following discussion provides an introduction to concepts an understanding of which is useful when discussing exemplary and non-limiting embodiments of Cross-Core Distance prefetching below. Assume that two cores 26 in a CMP 12 have the following TLB miss virtual page streams with all misses of, for example, core 26(0) occurring before those of core 26(1):

Core 26(0) TLB Miss Virtual Pages: 3, 4, 6, 7
Core 26(1) TLB Miss Virtual Pages: 7, 8, 10, 11

Here, a stride of four (4) pages repeats between the missing virtual pages on the two cores 26(0), 26(1). Due to timing interleaving and global communication, cross-core patterns are hard to detect and store directly. Therefore, exemplary embodiments described herein utilize differences, or distances between successive missing virtual pages on the same core 26 but makes distance patterns available to other cores 26. For example, the first difference on core 26(0) is one (1) page (page 4–page 3). Overall, the distances are:

Core 26(0) Distances: 1, 2, 1
Core 26(1) Distances: 1, 2, 1

Although the cores 26(0), 26(1) are missing on different virtual pages (3,4,6,7 vs. 7,8,10,11), both cores 26(0), 26(1) have the same distance pattern in their misses. Exemplary embodiments disclosed herein exploit this similarity in miss patterns. Specifically, in accordance with an exemplary embodiment, a distance table 32 is utilized to record repetitive distance-pairs, in this example, the pairs (1, 2) and (2, 1). The distance table structure may be implemented as one or more registers or in random access memory (RAM) accessible by more than one core 26. As a result, on a TLB miss from a core 26, the current distance (current missing virtual page–last missing virtual page) is used to scan the observed distance pairs to find the next predicted distance, and hence a predicted next virtual page address for the next likely miss. The matching translation entry from the predicted next virtual page is then prefetched. In the present example, core 26(0) experiences all its misses, recording the distance-pairs (1, 2) and (2, 1). Then, once core 26(1) TLB misses on pages 7 and 8 (current distance 1), the distance-pair (1, 2) reveals that the next needed virtual page is predicted to be 2 pages away. A subsequent prefetch of the predicted page therefore eliminates the miss on page 10. Similarly, the TLB miss on page 11 is also eliminated (using the (2, 1) pair).

Figure 6A:
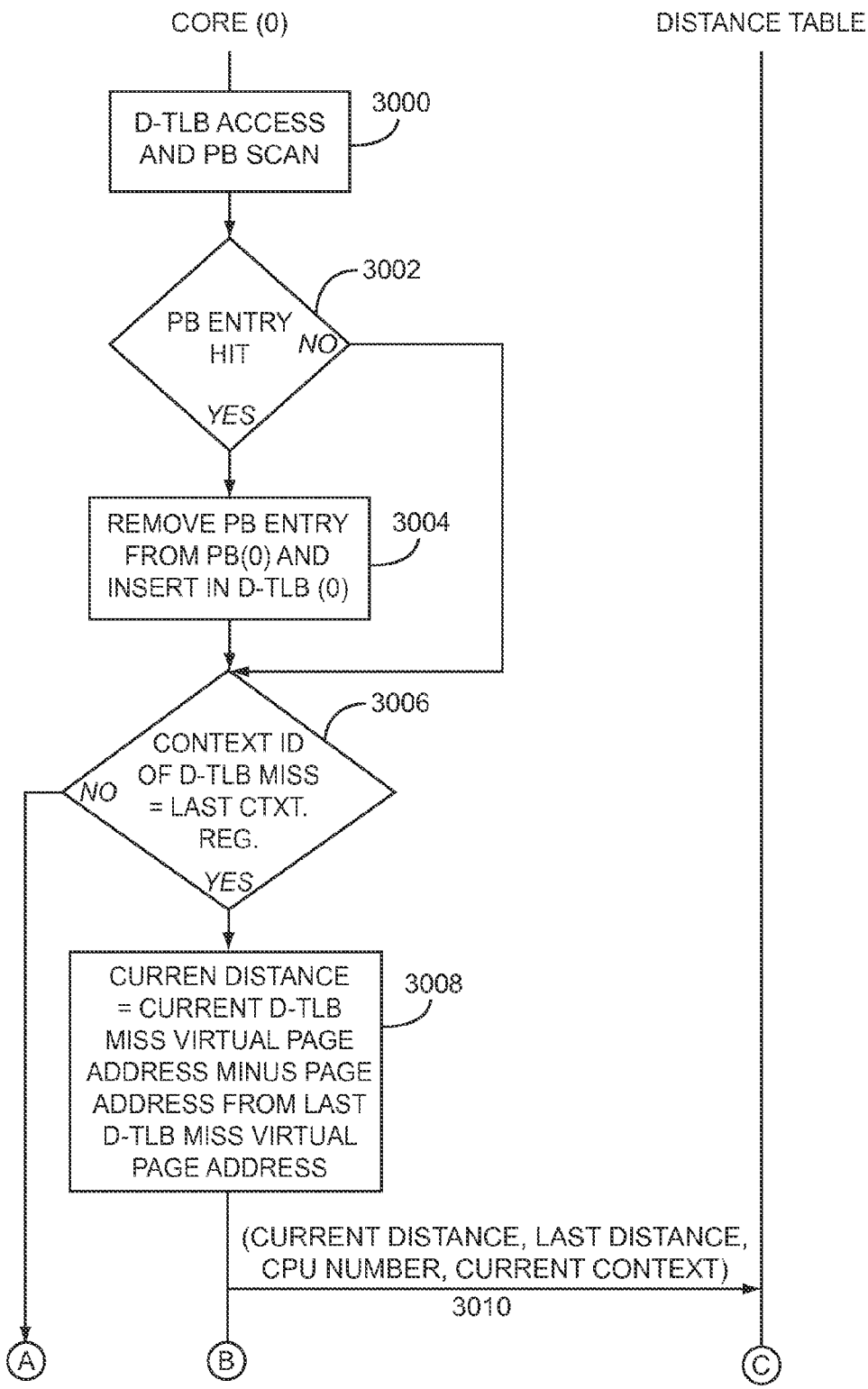
FIGS. 6A-6B illustrate a flow chart illustrating the operation of a plurality of cores in an N-Core CMP according to an exemplary embodiment of a Distance-based Cross-Core prefetching scheme.
Figure 6B:
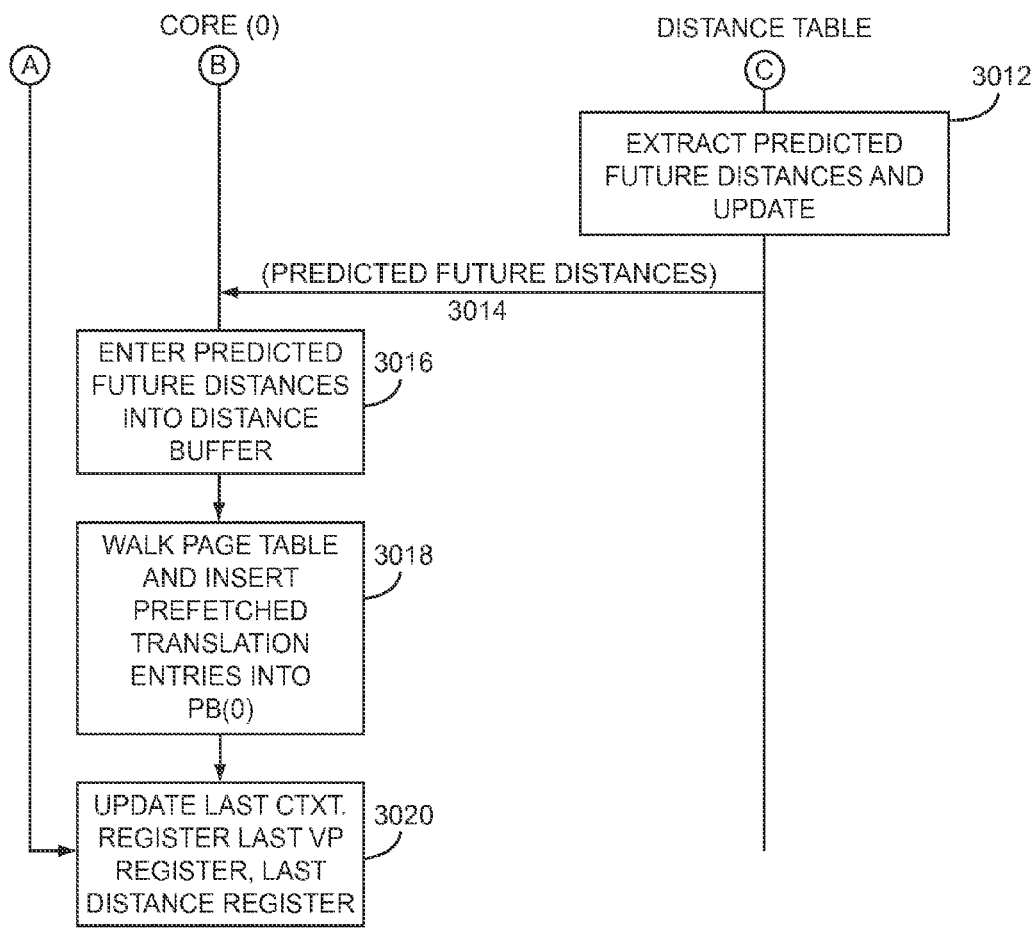
Figure 7:
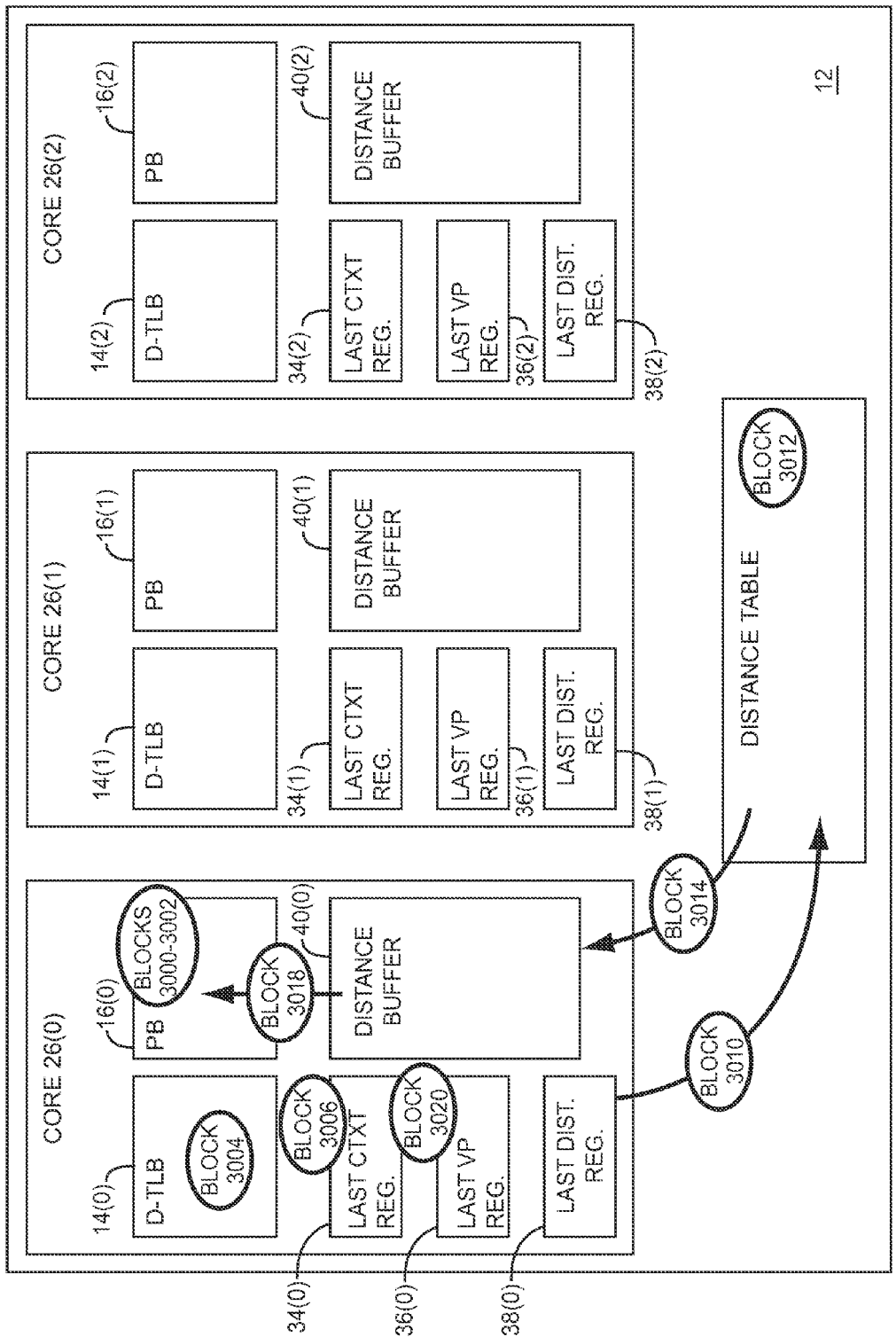
FIG. 7 is an illustration of the operation of a CMP according to the exemplary embodiment of FIGS. 6A-6B.

FIGS. 6A-6B illustrate a communication flow diagram of Distance-based Cross-Core prefetching according to an exemplary embodiment disclosed herein. FIGS. 6A-6C is described concurrently with reference to FIG. 7. FIG. 7 is an illustration of CMP 12 showing the flow of information described in FIGS. 6A-6C. In the exemplary embodiment illustrated, a CMP 12 has three cores with each core 26 operating to prefetch entries into an associated PB 16. In addition, each core 26 includes three registers, specifically, a Last Ctxt register 34, a Last VP register 36, and a Last Distance register 38. The function of each of these registers 34, 36, 38 is described below. Each core 26 further includes a distance buffer 40 the function of which is described below. In an exemplary embodiment, distance buffer 40 may be implemented as part of CMP 12 and may be realized in either hardware, software, or a combination or the two. However implemented, distance buffer 40 is shared by and accessible to all cores 26.

With reference to FIG. 6, when a D-TLB 14(0) is accessed to check for a page entry, PB 16(0) is scanned at approximately the same time to check for the page entry (block 3000). Assuming a D-TLB miss, a check is performed to see if there is a PB hit on the page entry in PB 16(0) (block 3002). This scan of PB 16(0) and the subsequent check for a PB hit or miss is illustrated in FIG. 7 as block numbers 3000-3002 associated with PB 16(0). Continuing with FIG. 6, if it determined that the scan of PB 16(0) yielded a PB miss, processing continues to block 3006, below, If, however, it is determined that a PB hit was encountered, the PB entry 18 is removed from PB 16(0) and inserted into D-TLB 14(0)(block 3004). This insertion of the entry into D-TLB 14(0) is illustrated in FIG. 7 as block number 3004 associated with D-TLB 14(0).

Continuing with FIG. 6, a check is performed to determine if the context ID of the current D-TLB miss is equal to the context ID of the last D-TLB miss (held in Last Ctxt. register 34(0))(block 3006). If there is no match, processing proceeds to block 3018. If there is a match, a current distance is calculated by subtracting the current D-TLB miss virtual page from the last D-TLB miss virtual page (held in the Last VP register 36(0))(block 3008) and core 26(0) sends the current distance, the last distance (from the Last Dist. Register 38(0)), the CPU number 28, and the current context to distance table 32 (block 3010) wherein is cached frequently used distance-pairs and to which access is shared by all the cores 26. In an exemplary embodiment, distance table 32 is located in close proximity, such as next to, the shared L2 cache (not shown). The check involving Last Ctxt. register 34(0) is illustrated in FIG. 7 as block number 3006 associated with Last Ctxt. register 34(0) while the sending of the information to distance table 32 is illustrated as block number 3010 associated with the arrow extending from core 26(0) to distance table 32.

Continuing with FIG. 6, distance table 32 uses the received current distance to extract predicted future distances from the distance-pairs stored in distance table 32 and updates itself using the last distance and current distance received from core 26(0) (block 3012). This extraction and updating is illustrated in FIG. 7 as block number 3012 associated with distance table 32.

Continuing with FIG. 6, a maximum of P predicted distances (the current distance may match with multiple distance-pairs) are sent from distance table 32 back to core 26(0) (block 3014), where they are entered into the distance buffer 40(0) (block 3016). In an exemplary embodiment, distance buffer 40(0) is a FIFO structure with size P to hold all newly predicted distances received from distance table 32. This sending of predicted future distances and entering in distance buffer 40(0) is illustrated in FIG. 7 as block number 3014 associated with the arrow extending from distance table 32 to distance buffer 40(0).

Continuing with FIG. 6, the predicted distances in distance buffer 40(0) are used by the core 26(0) to calculate one or more corresponding virtual pages and walk the page table to obtain prefetched translation entries. When these prefetched translation entries are obtained, they are inserted or pulled into the PB 16(0) (block 3018). Note that, unlike the Leader-Follower embodiment described above, the present embodiment is a pull mechanism because, for example, core 26(0) with each D-TLB miss prefetches further translation entries to itself rather than to other cores 26. This utilization of predicted distances to walk the page table and pull the results into PB 16(0) is illustrated in FIG. 7 as block number 3018 associated with the arrow extending from distance buffer 40(0) to PB 16(0).

A number of options exist for the page table walk of block 3018. In one exemplary embodiment a hardware-managed D-TLB 14(0) could use its hardware state machine without involvement from the workload which could execute in parallel with the page table walk. In accordance with another exemplary embodiment, a software-managed D-TLB 14(0) may execute the page table walk within the interrupt caused by the initiating D-TLB miss.

Continuing with FIG. 6, the Last Ctxt. register 34(0), Last VP register 36(0) and Last Dist. Register 38(0) are updated with the current context, current virtual page, and current distance, respectively (block 3020). This updating of registers 34, 36, 38 is illustrated in FIG. 7 as block number 3020 spanning Last Ctxt. register 34(0), Last VP register 36(0) and Last Dist. Register 38(0).

Figure 8A:
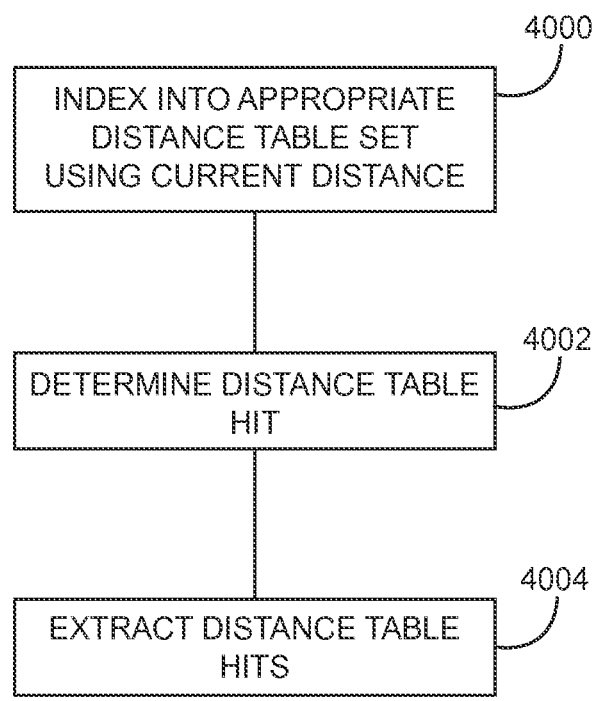
FIG. 8A is a flow chart illustrating a lookup operation of a distance table according to an exemplary embodiment of a Distance-based Cross-Core prefetching scheme.
Figure 8B:
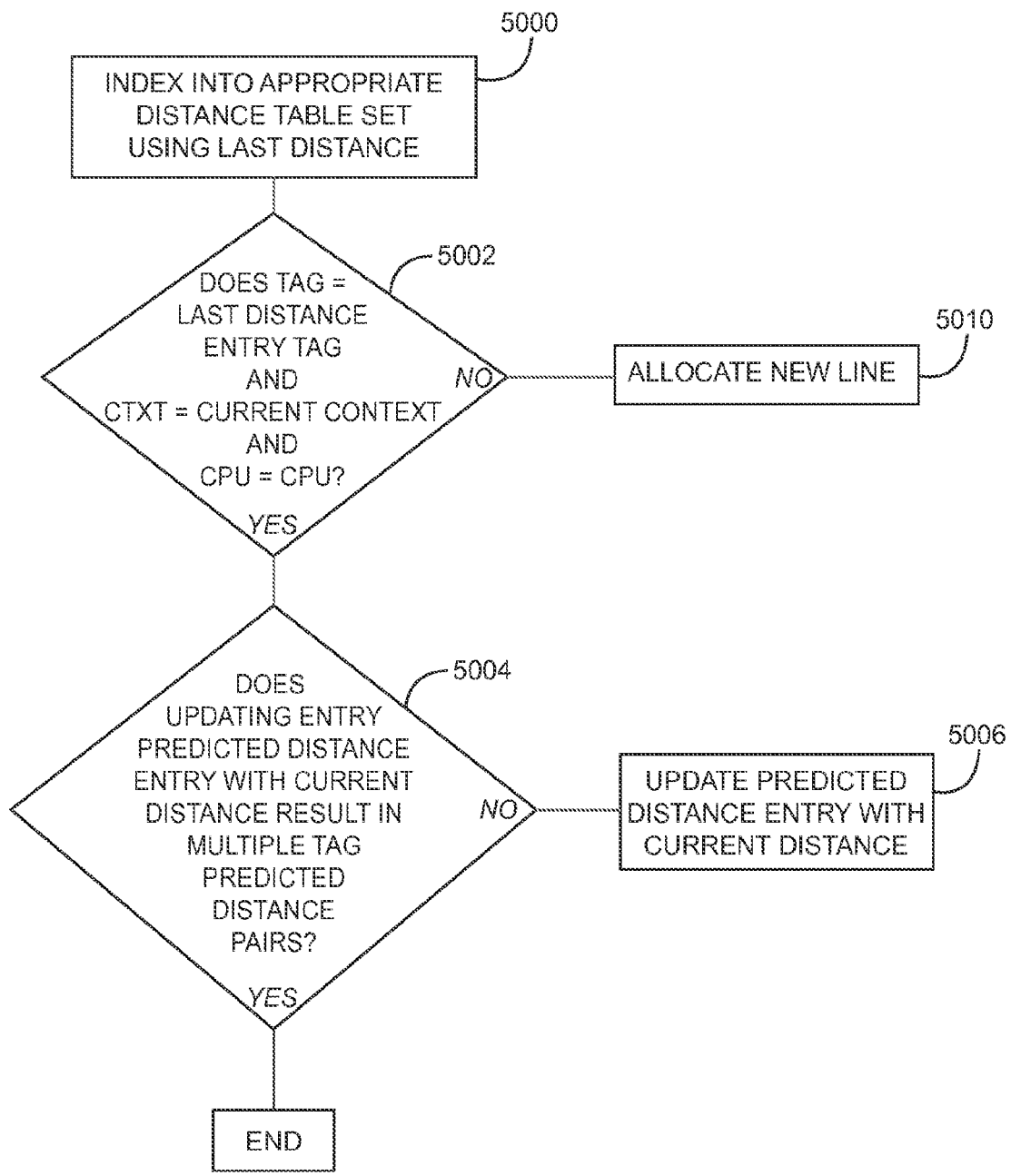
FIG. 8B is a flow chart illustrating an update operation of a distance table according to an exemplary embodiment of a Distance-based Cross-Core prefetching scheme.

FIG. 8A and FIG. 8B are communication flow diagrams of the operation of distance table 32 according to an exemplary embodiment disclosed herein. Specifically, FIG. 8A illustrates the operation of distance table 32 when performing a lookup and FIG. 8B illustrates the operation of distance table 32 when performing an update.

Figure 9A:
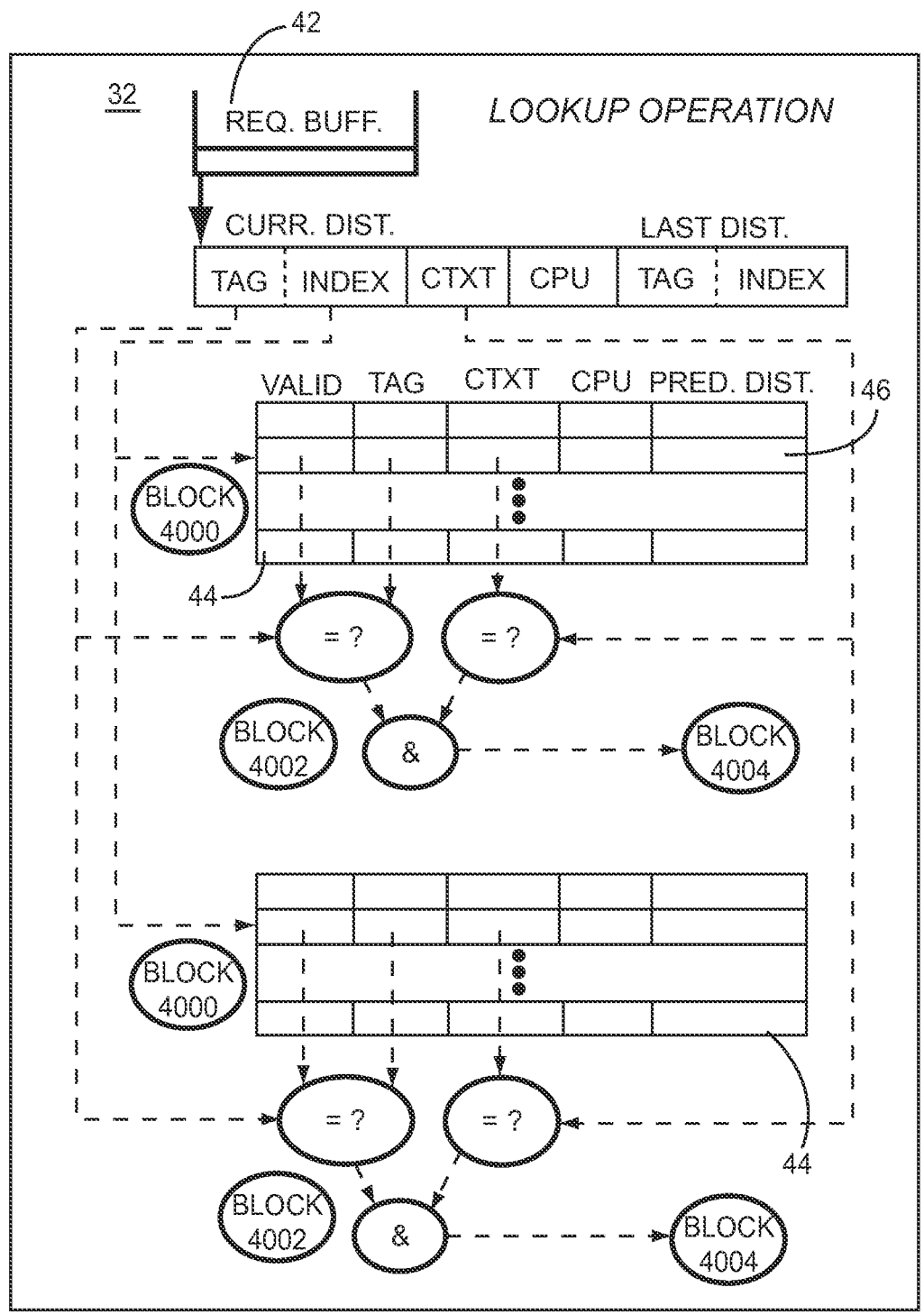
FIG. 9A is an illustration of the operation of a distance table according to the exemplary embodiment of FIG. 8A.

FIG. 8A is described concurrently with reference to FIG. 9A. FIG. 9A is an illustration of distance table 32 showing the flow of information described in FIG. 8A. In the exemplary embodiment illustrated, a request buffer 42 enqueues requests from all cores 26. As discussed with reference to block 3010 of FIG. 6, each request includes the current distance (comprised of a tag and an index), the context, the CPU number of the core 26 initiating the request, and the last distance value (comprised of a tag and an index). Distance table 32 comprises one or more distance table sets 44 each corresponding to a unique index. Each distance table set 44 comprises one or more distance table entries 46 each having a Valid bit, a Tag (to compare the distance used to address into the distance table 32), Ctxt bits for the context ID of the stored distance-pair, the CPU number of the core 26 from which this distance-pair was recorded, and the Pred. Dist. or next predicted distance.

With reference to FIG. 8A, the lower order bits of the current distance from the request buffer 42 is used to index into an appropriate distance table set 44 (block 4000). While illustrated according to an exemplary embodiment employing a 2-way set associative distance table 32, the associativity may be higher. This indexing is illustrated in FIG. 9A as block number 4000 associated with the arrow extending from the index of the current distance to a distance table set 44.

Continuing with FIG. 8A, for all indexed distance table entries 46 having valid bit 20 indicating "valid", a check is performed to determine if there are any distance table hits (block 4002). A distance table hit occurs whenever (1) the distance table entry tag value matches the current distance tag, and (2) the distance table Ctxt bits match the current context. Multiple matches are possible since the same current distance may imply multiple future distances. The determination of one or more distance table hits is illustrated in FIG. 9A as two "=?" symbols indicating comparisons to check for the equality of (1) a distance table entry 46 tag value and the current distance tag, and (2) a distance table entry Ctxt bits and the current context. The logical "AND" function of each comparison is indicated by "&" and illustrated as associated with block 4002.

Continuing with FIG. 8A, when a distance table hit is determined, the Pred. Dist. entry value of the distance table entry 46 is extracted (block 4004). Because a distance table entry may have been allocated by a core 26 different from the requesting core 26, inter-core D-TLB miss commonality is leveraged. As illustrated, the maximum number of prefetches is equal to the associativity of distance table 32. This extraction is illustrated in FIG. 9A as the extended arrow associated with block 4004.

Figure 9B:
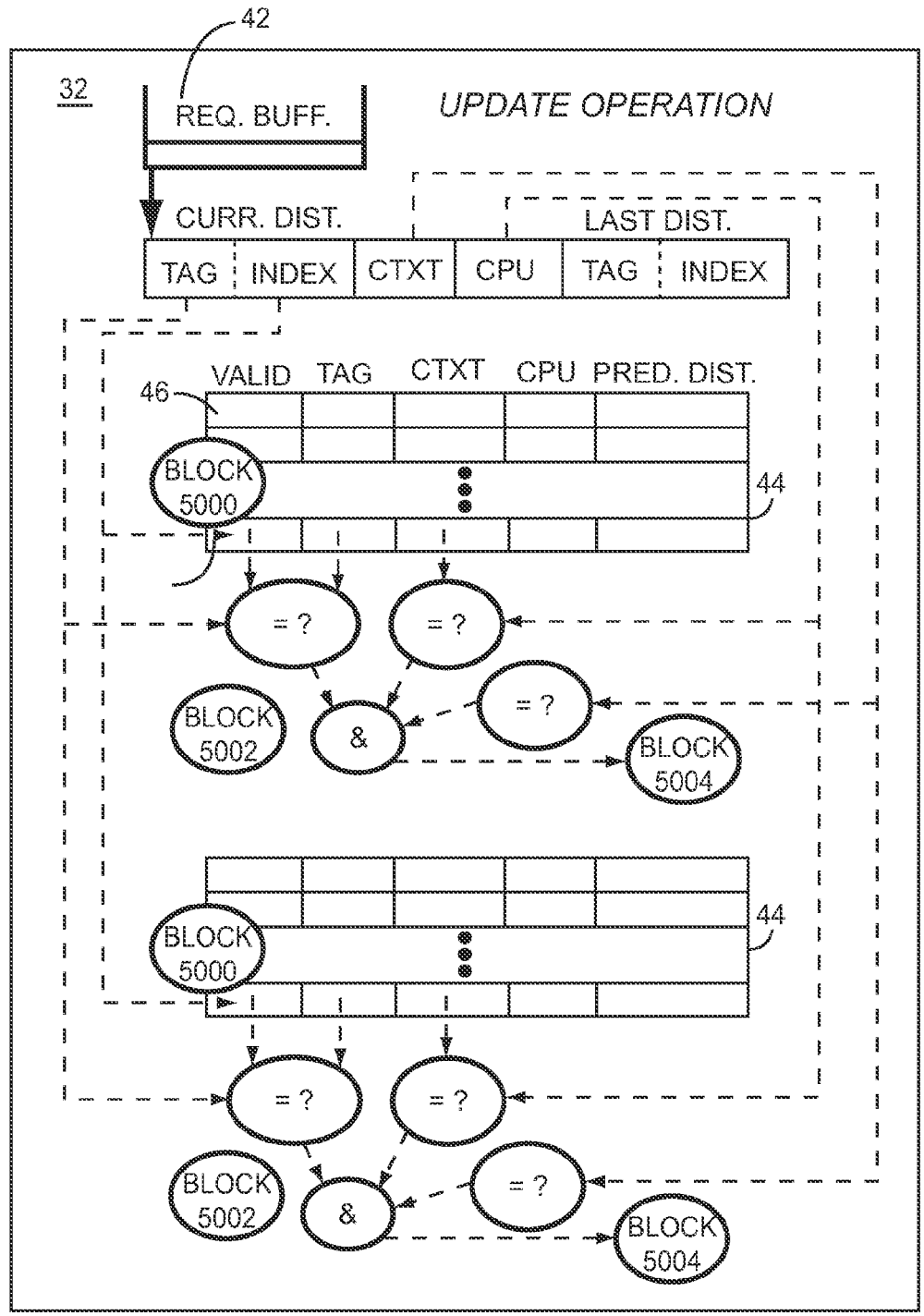
FIG. 9B is an illustration of the operation of a distance table according to the exemplary embodiment of FIG. 8B.

FIG. 8B is described concurrently with reference to FIG. 9B. FIG. 9B is an illustration of distance table 32 showing the flow of information described in FIG. 8B. In the exemplary embodiment illustrated, a request buffer 42 enqueues requests from all cores 26. As discussed with reference to block 3010 of FIG. 6, each request includes the current distance (comprised of a tag and an index), the context, the CPU number of the core 26 initiating the request, and the last distance value (comprised of a tag and an index). Distance table 32 comprises one or more distance table sets 44 each corresponding to a unique index. Each distance table set 44 comprises one or more distance table entries 46 each having a Valid bit, a Tag (to compare the distance used to address into the distance table 32), Ctxt bits for the context ID of the stored distance-pair, the CPU number of the core 26 from which this distance-pair was recorded, and the Pred. Dist. or next predicted distance.

With reference to FIG. 9B, the lower order bits of the last distance from the request buffer 42 is used into index into an appropriate distance table set 44 (block 5000). This indexing is illustrated in FIG. 9B as block number 5000 associated with the arrow extending from the index of the last distance to a distance table set 44.

Continuing with FIG. 8B, for each distance table entry 46 in an appropriate distance table set 44, the valid bit is checked. Then, (1) the tag is compared with the last distance tag portion, (2) the Ctxt bits are compared with the current context and (3) the CPU bits of the CPU entry are compared with the requesting CPU (block 5002). The last comparison is the result of the fact that distances are calculated relative to D-TLB misses from the same core 26. The determination of the three equalities is illustrated in FIG. 9B as three "=?" symbols indicating comparisons to check for the equality of (1) the tag the last distance tag portion, (2) the Ctxt bits the current context and (3) the CPU bits of the CPU entry and the requesting CPU. The logical "AND" function of each comparison is indicated by "&" and associated with block number 5002.

If all three comparisons are found to indicate equalities, a check is performed to see if updating the Pred. Dist. entry in the distance table entry 46 with the current distance will result in multiple distance table entries 46 in the same distance table set 44 having the same Tag, Pred. Dist. pair as might happen when multiple cores 26 see the same distance-pairs (block 5004). If true, the storing of redundant distance-pairs by not performed and the process ends (block 5008). If however, no duplicates exist, Pred. Dist. entry is updated with the current distance (block 5006). If, at block 5002, no matching entry in any distance table set is found, a new line in a distance table set is allocated with the tag, context, and CPU bits set appropriately (block 5010). When doing so, in an exemplary embodiment, distance table 32 uses a least-recently used replacement policy.

Like the exemplary embodiments of Leader-Follower prefetching described above, Distance-based, Cross-Core prefetching is shootdown-aware. That is to say, PB entries 18 can be invalidated when necessary. Since distance table 32 only maintains distance-pairs and not translation entries, Distance-based, Cross-Core prefetching is agnostic to D-TLB shootdowns. Second, Distance-based, Cross-Core prefetching is multiple-pull. Specifically, prefetches for translations are pulled only into the core 26 which experienced the initial D-TLB miss. Furthermore, multiple prefetches (limited by the associativity of the distance table 32) may be initiated by a single miss. Third, distance table 32 predicts future distances but the corresponding translations need to be found by each core 26. This differs from the Leader-Follower embodiments described above in which the leader core 26 directly pushes the required translation into the PBs 16 of the other cores 26. Fourth, since the distance table 32 induces additional page table walks, it may be advantageous to account for page faults. In accordance with the exemplary embodiments described above, it is assumed that non-faulting prefetches in which the page walk is aborted do not result in an interruption of the OS if the entry is not found. Finally, while Distance-based Cross-Core prefetching as described herein reduces ICPS D-TLB misses, it can also help with ICS misses and distance pairs seen on only one core 26. Hence, some benefits of uniprocessor D-TLB prefetching are also provided by the application of exemplary embodiments described herein.

Simulations of CMP 12 performance have shown that the combination of Leader-Follower prefetching and Distance-based Cross-Core prefetching may be implemented with modest hardware to eliminate 13-89% of TLB misses across standard parallel benchmarks. Further, while a fully hardware implementation may yield average performance improvements of 8-46%, even after moving significant components of the prefetcher into software average improvements of 4-32% may be achieved.

In some exemplary and non-limiting embodiments, fully-hardware prefetching is employed using hardware state machines to walk the page table. In such instances, DT-induced translation searches proceed without OS or program intervention.

There is now discussed MMUs with software-managed TLBs 14. Since software-managed TLBs 14 rely on the OS for page table walks, ICC prefetching should be adapted accordingly. While Leader-Follower prefetching remains unaffected for software-managed TLBs, there are two cases to consider for Distance-based Cross-Core prefetching.

When a core 26 misses in both the D-TLB 14 and PB 16, the OS receives an interrupt. In this case, the interrupt handler may assume responsibility for conducting page table walks for the suggested distances from the distance table 32. If a PB hit occurs, there is no interrupt. At the same time, the distance table 32 suggests predicted distances for which page table walks are needed.

A solution is to limit Distance-based Cross-Core prefetches to instances when both the D-TLB and PB miss, because in these cases the OS will be interrupted anyway. In particular, in an exemplary embodiment Burst Distance-based Cross-Core prefetching is employed. In an exemplary embodiment, distance table 32 prefetches are performed only when both the D-TLB 14 and PB 16 miss; however, instead of prefetching just the predicted distances relative to the current distance, these predicted distances are used to re-index into the distance table 32 and predict future distances as well. Suppose, for example, that a current distance yields the predicted distances pred0 and pred1. In an exemplary embodiment, pred0 will then re-index the distance table 32 to find its own set of predicted distances (e.g., pred3 and pred4). Similarly, pred1 may then be used to index the distance table 32. In effect, such an embodiment limits prefetches to PB misses but compensates by aggressively prefetching in bursts at this point.

As described in exemplary and non-limiting embodiments above, variants of Leader-Follower and Distance-based Cross-Core prefetching may utilize a plurality of cores 26 wherein each core 26 incorporates or is otherwise associated with a PB 16. In accordance with such non-limiting embodiments, there has been described the prefetching of, for example, a translation entry from a PB 16 of a first core 26 to a PB 16 of a second core 26 and then to a TLB 14 of the second core 26. However, other exemplary embodiments are not so limited. Specifically, in some exemplary and non-limiting embodiments, a single PB 16 may be shared by one or more cores 26. Such a single, centralized PB 16 may be implemented in hardware, as software or some combination of the two. In other exemplary embodiments, there may be no PBs 16 at all. For example, translation entries, such as those arising from page walks, may be prefetched directly into one or more TLBs 14 associated with a core 26 without ever being stored in a PB 16.

As described in exemplary and non-limiting embodiments above, variants of Leader-Follower and Distance-based Cross-Core prefetching may utilize a plurality of cores 26 wherein each core 26 incorporates or is otherwise associated with a confidence counter 30. However, other exemplary embodiments are not so limited. Specifically, in some exemplary and non-limiting embodiments, a single confidence counter 30 may be shared by one or more cores 26. Such a single, confidence counter 30 may be implemented in hardware, as software or some combination of the two.

Those skilled in the art will recognize improvements and modifications to the preferred embodiments of the present invention. All such improvements and modifications are considered within the scope of the concepts disclosed herein and the claims that follow.

What is claimed is:

1. A chip multiprocessor comprising:
   at least one prefetch buffer (PB); and
   a plurality of cores each communicatively coupled to the at least one prefetch buffer and comprising a translation lookaside buffer (TLB), wherein each of the plurality of cores is adapted to:
   determine a TLB miss on the TLB for a virtual page address;

determine whether or not there is a PB hit on a PB entry
in the at least one PB for the virtual page address;
if it is determined that there is a PB hit:
add the PB entry to the TLB; and
if it is determined that the PB entry was prefetched from another of the plurality of cores, send a request to the other of the plurality of cores from which the PB entry was prefetched requesting an increase in a value of a confidence counter associated with the core;
if it is determined that there is not a PB hit:
use the virtual page address to perform a page walk to determine a translation entry;
add the translation entry to the TLB;
prefetch the translation entry to each of the other plurality of cores each associated with a confidence counter value greater than or equal to a predetermined amount;
send a request to increase a value of a confidence counter associated with the core; and
send a request to decrease a value of a confidence counter on the occurrence of a PB entry eviction.

2. The chip multiprocessor of claim 1 wherein each of the plurality of cores is further adapted to prefetch the translation entry to at least one PB associated with at least one of the plurality of cores.

3. The chip multiprocessor of claim 1 wherein each of the plurality of cores is further configured to receive a translation entry.

4. The chip multiprocessor of claim 3 wherein the translation entry is received from another of the plurality of cores.

5. The chip multiprocessor of claim 3 wherein the translation entry is added to a PB associated with the core.

6. The chip multiprocessor of claim 3 wherein the translation entry is added to the TLB of the core.

7. The chip multiprocessor of claim 1 wherein each of the plurality of cores is further adapted to receive a request to decrease a value of a confidence counter associated with another core.

8. The chip multiprocessor of claim 1 wherein each of the plurality of cores is further configured to:
receive a request to increase the value of a confidence counter associated with another one of the plurality of cores; and
increase the value of the confidence counter associated with the other one of the plurality of cores.

9. The chip multiprocessor of claim 8 wherein the request to increase the value of a confidence counter associated with the other one of the plurality of cores is received from another one of the plurality of cores.

10. The chip multiprocessor of claim 8 wherein the predetermined amount is $2^{B-1}$ where B is a number of bits comprising each confidence counter.

11. A method for performing Leader-Follower prefetching comprising:
determining, at a core, a TLB miss on a TLB for a virtual page address;
determining whether or not there is a PB hit on a PB entry in a PB for the virtual page address;
if it is determined that there is a PB hit:
adding the PB entry to the TLB; and
if it is further determined that the PB entry was prefetched from another of cores, sending a request to increase a value of a confidence counter associated with the core from which the PB entry was prefetched; and
if it is determined that there is not a PB hit:
using the virtual page address to perform a page walk to determine a translation entry;
adding the translation entry to the TLB;
prefetching the translation entry to each of one or more other cores associated with a confidence counter value greater than or equal to a predetermined amount; and
sending a request to increase the value of a confidence counter associated with the core.

12. The method of claim 11 wherein prefetching the translation entry comprises prefetching the translation entry to at least one PB associated with at least one of the plurality of cores.

13. The method of claim 11 further comprising:
receiving a translation entry; and
adding the received translation entry to the core.

14. The method of claim 13 wherein the translation entry is received from another of a plurality of cores.

15. The method of claim 13 wherein the translation entry is added to a PB associated with the core.

16. The method of claim 13 wherein the translation entry is added to the TLB of the core.

17. The method of claim 11 further comprising receiving a request to decrease a value of a confidence counter associated with another core.

18. The method of claim 11 further comprising:
receiving a request to increase a value of a confidence counter associated with one of a plurality of other cores; and
increasing the value of the confidence counter associated with the one of the plurality of other cores.

19. The method of claim 18 wherein the request to increase the value of a confidence counter associated the one of the plurality of other cores is received from the one of the plurality of other cores.

20. The method of claim 18 wherein the predetermined amount is $2^{B-1}$ where B is a number of bits comprising each confidence counter.

21. A chip multiprocessor comprising:
a plurality of cores each comprising a translation lookaside buffer (TLB) wherein each of the plurality of cores is configured to:
determine a current TLB miss on the TLB for a current virtual page address;
determine if a context ID of the current TLB miss is equal to a context ID of a last TLB miss;
if it is determined that the context ID of the current TLB miss is equal to the context ID of the last TLB miss:
determine a current distance between the current virtual page address and a last virtual page address;
send a request comprising the current distance to query a distance table; and
receive, in response to the request, a predicted future distance between the current virtual page address and a next virtual page address predicted to result in a future TLB miss.

22. The chip multiprocessor of claim 21 wherein each of the plurality of cores is further configured to:
determine if there is a PB hit on the current virtual page address; and
if it is determined that there is a PB hit on the current virtual page address, removing a PB entry associated with the current virtual page address and adding the PB entry to the TLB.

23. The chip multiprocessor of claim 21 wherein the request further comprises a last distance, a CPU number and the context ID of the current TLB miss.

24. The chip multiprocessor of claim 23 further configured to:
- update a last context register with the context ID of the current TLB miss;
- update a last virtual page register with the current virtual page address; and
- update a last distance register with the current distance.

25. The chip multiprocessor of claim 21 wherein the distance table is accessible by each of the plurality of cores.

26. A method for performing Distance-based Cross-Core prefetching comprising:
- determining a current TLB miss on a TLB for a current virtual page address;
- determining if a context ID of the current TLB miss is equal to a context ID of a last TLB miss;
- if it is determined that the context ID of the current TLB miss is equal to the context ID of the last TLB miss:
  - determining a current distance between the current virtual page address and a last virtual page address;
  - sending a request comprising the current distance to query a distance table; and
  - receiving, in response to sending the request, a predicted future distance between the current virtual page address and a next virtual page address predicted to result in a future TLB miss.

27. The method of claim 26 further comprising:
- storing the predicted future distance in a distance buffer;
- performing a page walk using the predicted future distance to determine a translation entry; and
- adding the translation entry to a prefetch buffer (PB).

28. The method of claim 26 wherein the request further comprises a last distance, a CPU number and the context ID of the current TLB miss.

29. The method of claim 26 further comprising:
- updating a last context register with the context ID of the current TLB miss;
- updating a last virtual page register with the current virtual page address; and
- updating a last distance register with the current distance.

30. The method of claim 26 wherein the distance table is accessible by each of a plurality of cores.

31. A chip multiprocessor comprising:
- a plurality of cores each comprising a translation lookaside buffer (TLB) and a prefetch buffer (PB), wherein each of the plurality of cores is configured to:
  - determine a TLB miss on the TLB of the core for a virtual page address; and
  - use the virtual page address to perform a page walk to determine a translation entry, add the translation entry to the TLB of the core and prefetch the translation entry to the PB of each other one of the plurality of cores if it is determined that there is a TLB miss.

* * * * *